United States Patent [19]

Gugumus

[11] Patent Number: 4,692,486

[45] Date of Patent: Sep. 8, 1987

[54] SYNERGISTIC MIXTURE OF LOW-MOLECULAR AND HIGH-MOLECULAR POLYALKYLPIPERIDINES

[75] Inventor: Francois Gugumus, Allschwil, Switzerland

[73] Assignee: Ciba-Geigy Corporation, Ardsley, N.Y.

[21] Appl. No.: 887,961

[22] Filed: Jul. 21, 1986

Related U.S. Application Data

[63] Continuation of Ser. No. 433,764, Oct. 12, 1982, abandoned.

[30] Foreign Application Priority Data

Oct. 16, 1981 [CH] Switzerland .......................... 6623/81

[51] Int. Cl.$^4$ ........................... C08K 5/34; C08K 5/35
[52] U.S. Cl. ..................................... 524/100; 524/97; 524/102; 524/103; 252/403
[58] Field of Search ................. 524/100, 102, 103, 97; 252/403

[56] References Cited

U.S. PATENT DOCUMENTS

| | | | |
|---|---|---|---|
| 3,925,376 | 12/1975 | Chalmers et al. | 524/100 |
| 3,941,744 | 3/1976 | Murayama et al. | 524/102 |
| 4,086,204 | 4/1978 | Cassandrini et al. | 524/102 |
| 4,108,829 | 8/1978 | Cassandrini et al. | 260/45 |
| 4,110,304 | 8/1978 | Gilg et al. | 524/102 |
| 4,161,592 | 7/1979 | Evans et al. | 544/198 |
| 4,177,186 | 12/1979 | Rody et al. | 524/102 |
| 4,210,612 | 7/1980 | Karrar | 524/102 |
| 4,232,131 | 11/1980 | Rody et al. | 525/184 |
| 4,233,410 | 11/1980 | Rody et al. | 525/123 |
| 4,233,412 | 11/1980 | Rody et al. | 525/167 |
| 4,260,689 | 4/1981 | Rody et al. | 525/55 |
| 4,260,691 | 4/1981 | Rody et al. | 525/130 |
| 4,263,434 | 4/1981 | Cassandrini et al. | 524/100 |
| 4,299,926 | 11/1981 | Rody et al. | 525/55 |
| 4,315,859 | 2/1982 | Nikles | 260/243 |
| 4,335,242 | 6/1982 | Wiezer et al. | 524/100 |
| 4,348,524 | 9/1982 | Karrar et al. | 524/103 |

OTHER PUBLICATIONS

G. Scott, "Antioxidants", Chemistry and Industry, Feb. 16, 1963, 271–281.
Ranby et al., Photodegradation, Photo-Oxidation and Photo-Stabilization of Polymers, pp. 418–422.
Gerald Scott "Developments in Polymer Stabilization—1"—pp. 246–303 and 307, (1979), Applied Science Publishers, LTD, London, England.

Primary Examiner—Veronica P. Hoke
Attorney, Agent, or Firm—Harry Falber

[57] ABSTRACT

Low-molecular and high-molecular polyalkylpiperidines are suitable as a synergistic mixture for stabilizing organic material, in particular organic polymers. The compounds are substances known per se. Thus, for example, the mixture of

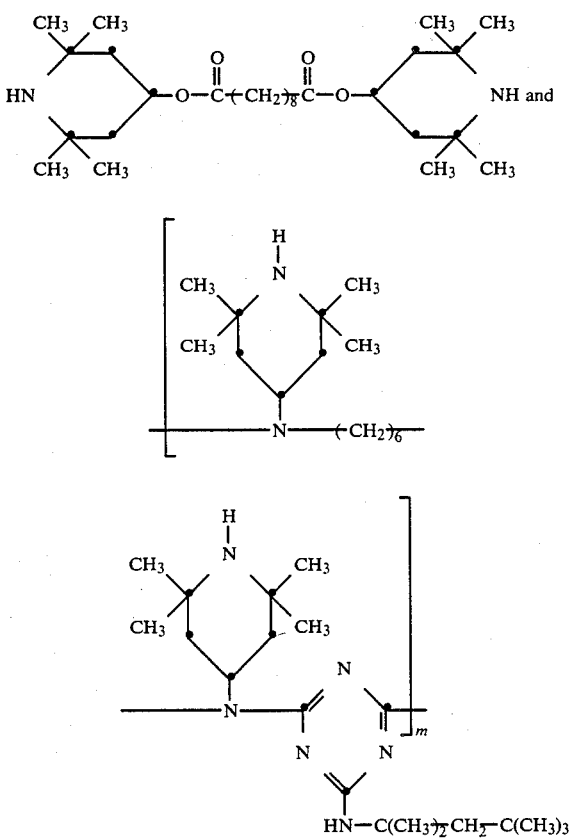

is distinguished by a pronounced synergism.

6 Claims, No Drawings

SYNERGISTIC MIXTURE OF LOW-MOLECULAR AND HIGH-MOLECULAR POLYALKYLPIPERIDINES

This is a continuation of application Ser. No. 433,764, filed Oct. 12, 1982, now abandoned.

The present invention relates to the combination of low-molecular and high-molecular polyalkylpiperidines as a stabiliser system for organic material, and also to the organic material protected by this stabiliser system.

In the past, low-molecular polyalkylpiperidines have been described as light stabilisers in numerous publications. Thus, for example, an important class of sterically hindered piperidines corresponding to the general formula

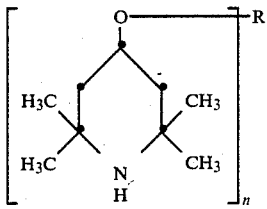

in which n is a number from 1 to 3 and R is a movement to trivalent hydrocarbon radical, has been described in U.S. Pat. No. 4,038,280.

More recently, various high-molecular polyalkylpiperidines which are suitable as light stabilisers have also been disclosed. Thus, for example, U.S. Pat. No. 4,233,412 has disclosed condensation and addition polymers containing sterically hindered piperidine groups, U.S. Pat. No. 4,210,612 has disclosed polyacrylates containing sterically hindered piperidine groups, and U.S. Pat. No. 4,086,204 has disclosed triazine polymers containing sterically hindered piperidine groups. Attempts have also been made to find synergistic mixtures in which one component is a sterically hindered piperidine and the other component is, for example, a conventional UV absorber. Mixtures of this type are known, for example, from U.S. Pat. No. 4,110,304, which describes mixtures of a low-molecular polyalkylpiperidine with benzophenones, benzotriazoles, oxalic acid dianilides or salicylic acid derivatives.

It has now been found that mixtures of low-molecular and high-molecular polyalkylpiperidines show a pronounced synergism as regards their light-stabilising activity. Those skilled in the art could not predict this increase in action because it involves a combination of light stabilisers which correspond to the same principle of action and are distinguished only by the different molecular weight. Customary synergistic mixtures consist of substances which differ greatly in structure and action, as is known, for example, for phenolic antioxidants and so-called thiosynergistic agents.

The present invention relates to a stabiliser system containing (A) a low-molecular, sterically hindered polyalkylpiperidine selected from the group comprising the compounds of the formulae (A-1) to (A-13)

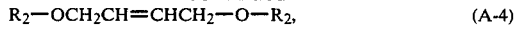

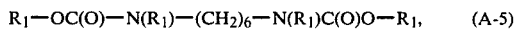

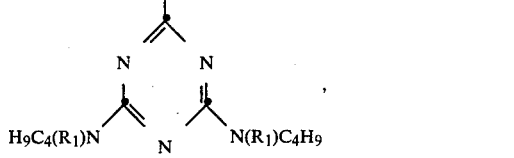

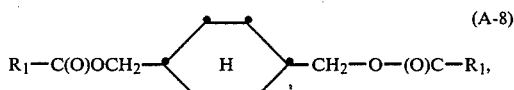

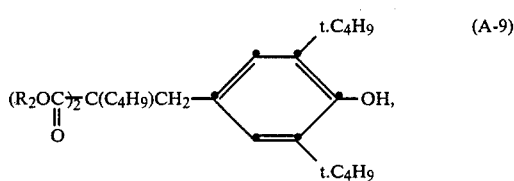

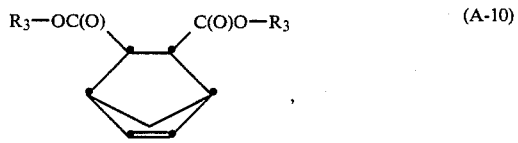

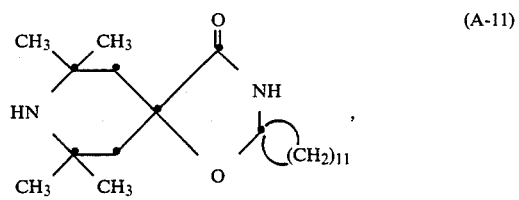

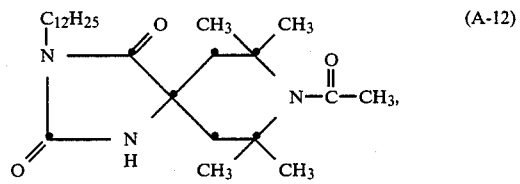

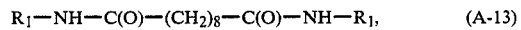

in which $R_1$ is a group of the formula

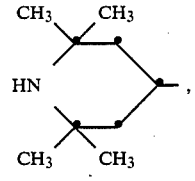

$R_2$ is a group of the formula

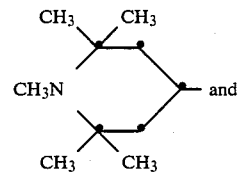

and $R_3$ is a group of the formula $+CH(COO-R_2)-CH_2+$ (B-1)

with degree of polymerisation of 5–100, preferably 5–50, particularly 10–25;

$+N(R_1)-(CH_2)_6-N(R_1)-(CH_2)_2+$ (B-2)

with degree of polymerisation of 5–50, preferably 5–25, particularly 5–15;

$+CH(COO-R_1)-CH_2+$  $+CH_2-CH_2+$ (B-3)

(I)        (II)

with molar ratio I:II = 1:10 to 1:20 and molecular weight of between 10,000 and 30,000;

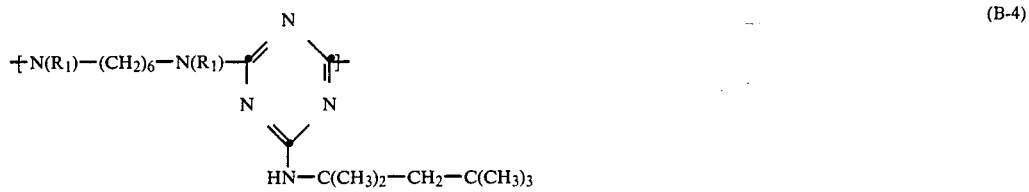

with degree of polymerisation of 3–50, preferably 3–25, particularly 3–8;

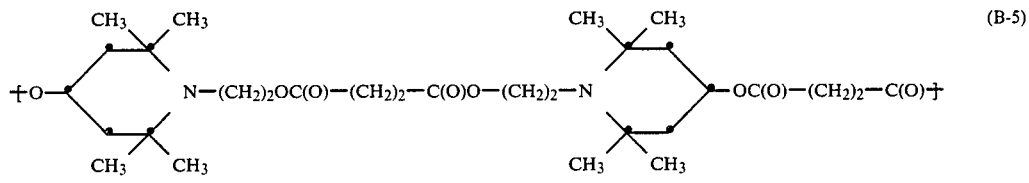

with degree of polymerisation of 2–25, preferably 2–12, particularly 2–7;

$+N(R_1)-(CH_2)_6-N(R_1)-C(O)-(CH_2)_4-C(O)+$ (B-6)

with degree of polymerisation of 5–50, preferably 5–25, particularly 5–15;

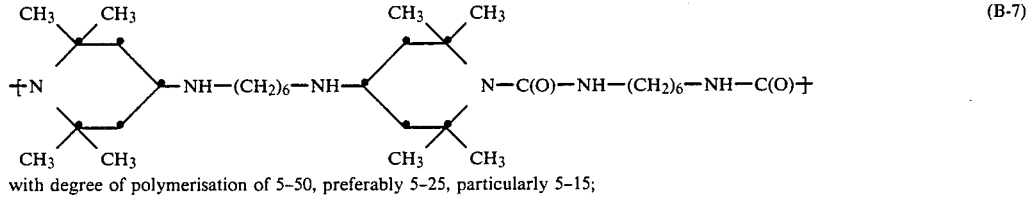

with degree of polymerisation of 5–50, preferably 5–25, particularly 5–15;

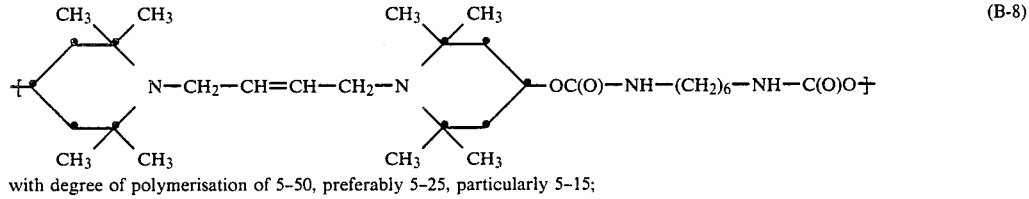

with degree of polymerisation of 5–50, preferably 5–25, particularly 5–15;

with degree of polymerisation of 5–50, preferably 5–25, particularly 5–15;

and (B) a high-molecular, sterically hindered polyalkylpiperidine selected from the group comprising compounds having one of the recurring units of the formulae (B-1) to (B-9):

and also the compound of the formula B-10

$R_4NH(CH_2)_3-N(R_4)-(CH_2)_2-N(R_4)-(CH_2)_3-NHR_4$ (B-10)

wherein $R_1$ and $R_2$ have the meanings given above, and $R_4$ is a group

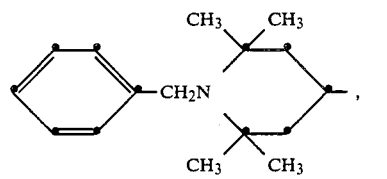

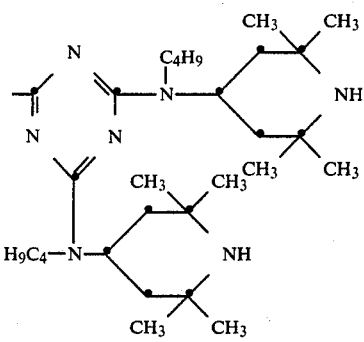

Of the components (A), compounds (A-1), (A-2), (A-5), (A-7), (A-8), (A-9), (A-11) and (A-12), and in particular compounds (A-1), (A-5), (A-9), (A-11) and (A-12), are preferred.

Of the components (B), compounds (B-1), (B-2), (B-3), (B-4), (B-5), (B-6) and (B-10) are particularly preferred.

The common feature of the mixtures of components (A) and (B) is that (A) is distinguished by a markedly lower molecular weight than (B), and that all compounds (A) and (B) represent polyalkylpiperidine derivatives and thus contain, for example, one of the radicals $R_1$, $R_2$, $R_3$ or $R_4$.

The compounds (A) and (B) are known substances and can be prepared by known methods.

The ratio (A):(B) can be chosen within wide limits. However, the synergism is particularly marked in mixtures in which the ratio (A):(B) is 10:1 to 1:10, preferably 5:1 to 1:5 and in particular 1:2 to 2:1.

The compounds (A) and (B) are added to the organic material to be protected in a total concentration of 0.01 to 5% by weight, based on the material to be protected. It is preferred to incorporate 0.03 to 1.5% by weight and particularly preferred to incorporate 0.2 to 0.6% by weight of the compounds.

The incorporation can be carried out before or after the polymerisation, for example by mixing the compounds, and further additives if appropriate, into the melt by the methods customary in the art, before or during the shaping process, or also by applying the dissolved or dispersed compounds onto the polymer, if appropriate with subsequent evaporation of the solvent.

The novel compounds can also be added to the material to be stabilised in the form of a master batch which contains these compounds in a concentration of, for example, 2.5 to 25% by weight.

In the case of crosslinked polyethylene, the compounds can be added before the crosslinking process.

The mixtures of one or more compounds (A) and of one or more compounds (B) are suitable for stabilising organic material against damage by the action of oxygen, heat and light. The following are examples of organic materials to be protected in this way:

1. Polymers of monoolefins and diolefins, for example polyethylene (which can be crosslinked if appropriate), polypropylene, polyisobutylene, polybut-1-ene, polymethylpent-1-ene, polyisoprene or polybutadiene, and also polymers of cycloolefins, for example of cyclopentene or norbornene.

2. Mixtures of the polymers mentioned under (1), for example mixtures of polypropylene with polyethylene or with polyisobutylene.

3. Copolymers of monoolefins and diolefins with one another or with other vinyl monomers, for example ethylene/propylene copolymers, propylene/but-1-ene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and their salts (ionomers), and also terpolymers of ethylene with propylene and a diene such as hexadiene, dicyclopentadiene or ethylidenenorbornene.

4. Polystyrene.

5. Copolymers of styrene or α-methylstyrene with dienes or acrylic derivatives, for example styrene/butadiene, styrene/acrylonitrile, styrene/ethyl methacrylate, styrene/butadiene/ethyl acrylate or styrene/acrylonitrile/methyl acrylate; high impact strength mixtures of styrene copolymers and of another polymer, for example a polyacylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

6. Graft copolymers of styrene, for example styrene grafted onto polybutadiene, styrene and acrylonitrile grafted onto polybutadiene, styrene and maleic anhydride grafted onto polybutadiene, styrene and alkyl acrylates or alkyl methacrylates grafted onto polybutadiene, styrene and acrylonitrile grafted onto ethylene/propylene/diene terpolymers, styrene and acrylonitrile grafted onto polyalkyl acrylates or polyalkyl methacrylates, or styrene and acrylonitrile grafted onto acrylate/butadiene copolymers, and also their mixtures with the copolymers mentioned under (5), such as those known, for example, as so-called ABS, MBS, ASA or AES polymers.

7. Halogen-containing polymers, for example polychloroprene, chlorinated rubber, chlorinated or chlorosulfonated polyethylene, or epichlorohydrin homopolymers and copolymers, in particular polymers of halogen-containing vinyl compounds, for example polyvinyl chloride, polyvinylidene chloride, polyvinyl fluoride or polyvinylidene fluoride; and also their copolymers such as vinyl chloride/vinylidene chloride, vinyl chloride/vinyl acetate or vinylidene chloride/vinyl acetate.

8. Polymers derived from α,β-unsaturated acids and their derivatives, such as polyacrylates and polymethacrylates, polyacrylamides and polyacrylonitriles.

9. Copolymers of the monomers mentioned under (8) with one another or with other unsaturated monomers, for example acrylonitrile/butadiene copolymers, acrylonitrile/alkyl acrylate copolymers, acrylonitrile/alkoxy acrylate copolymers, acrylonitrile/vinyl halide copolymers or acrylonitrile/alkyl methacrylate/butadiene terpolymers.

10. Polymers derived from unsaturated alcohols and amines, or their acyl derivatives, or acetals, such as polyvinyl alcohol, polyvinyl acetate, polyvinyl stearate, polyvinyl benzoate, polyvinyl maleate, polyvinylbutyral, polyallyl phthalate or polyallylmelamine.

11. Homopolymers and copolymers of cyclic ethers, such as polyethylene glycols, polyethylene oxide, polypropylene oxide or their copolymers with bis-glycidyl ethers.

12. Polyacetals such as polyoxymethylene, and also polyoxymethylenes which contain comonomers, for example ethylene oxide.

13. Polyphenylene oxide and sulfides.

14. Polyurethanes derived, on the other hand, from polyethers, polyesters and polybutadienes with terminal hydroxyl groups, and, on the other hand, from aliphatic or aromatic polyisocyanates, and also their initial products (polyisocyanates, polyols and prepolymers).

15. Polyamides and copolyamides derived from diamines and dicarboxylic acids and/or from aminocarboxylic acids or the corresponding lactams, such as polyamide 4, polyamide 6, polyamide 6,6, polyamide 6,10, polyamide 11, polyamide 12, poly-2,4,4-trimethylhexamethylene terephthalamide of poly-m-phenylene isophthalamide, and also their copolymers with polyethers, for example with polyethylene glycol, polypropylene glycol or polytetramethylene glycol.

16. Polyureas, polyimides and polyamide-imides.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly-[2,2-bis-(4-hydroxyphenyl)-propane] terephthalate or polyhydroxybenzoates, and also block polyetheresters derived from polyethylene with hydroxyl end groups, dialcohols and dicarboxylic acids.

18. Polycarbonates.

19. Polysulfones and polyether-sulfones.

20. Crosslinked polymers derived, on the one hand, from aldehydes, and, on the other hand, from phenols, urea or melamine, such as phenol/formaldehyde resins, urea/formaldehyde resins and melamine/formaldehyde resins.

21. Drying and non-drying alkyd resins.

22. Unsaturated polyester resins derived from copolyesters of saturated and unsaturated dicarboxylic acids with polyhydric alcohols, and vinyl compounds as crosslinking agents, and also their halogen-containing, slow-burning modifications.

23. Crosslinkable acrylic resins derived from substituted acrylic acid esters, for example from epoxyacrylates, urethane-acrylates or polyester-acrylates.

24. Alkyd resins, polyester resins and acrylate resins crosslinked with melamine resins, urea resins, polyisocyanates or epoxide resins.

25. Crosslinked epoxy resins derived from polyepoxides, for example from bis-glycidyl ethers or from cycloaliphatic diepoxides.

26. Natural polymers such as cellulose, natural rubber and gelatin, and also their derivatives chemically modified to give homologous polymers, such as cellulose acetates, propionates and butyrates, or the cellulose ethers such as methylcellulose.

The organic materials stabilised in this way are preferably organic polymers which can be used in the most diverse forms, for example as mouldings, films, fibres, foams, profiles or coating agents, or as binders for lacquers, adhesives or putties.

The stabiliser systems according to the invention can be used together with other additives, which are used in customary concentrations. Examples of the latter are:

1. ANTIOXIDANTS

1.1 Alkylated monophenols 2,6-Di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-i-butylphenol, 2,6-di-cyclopentyl-4-methylphenol, 2-(α-methyl-cyclohexyl)-4,6-dimethylphenol, 2,6-di-octadecyl-4-methylphenol, 2,4,6-tri-cyclohexylphenol and 2,6-di-tert.-butyl-4-methoxymethylphenol.

1.2. Alkylated hydroquinones 2,6-Di-tert.-butyl-4-methoxyphenol, 2,5-di-tert.-butyl hydroquione and 2,5-di-tert.-amyl hydroquinone.

1.3. Hydroxylated thiodiphenyl ethers 2,2'-Thio-bis-(6-tert.-butyl-4-methylphenol), 2,2'-thio-bis-(4-octyphenol), 4,4'-thio-bis-(6-tert.-butyl-3-methylphenol) and 4,4'-thio-bis-(6-tert.-butyl-2-methylphenol).

1.4. Alkylidene-bis-phenols 2,2'-Methylene-bis-(6-tert.-butyl-4-methylphenol), 2,2'-methylene-bis-(6-tert.-butyl-4-ethylphenol), 2,2'-methylene-bis-[4-methyl-6-(α-methylcyclohexyl)-phenol], 2,2°-methylene-bis-(4-methyl-6-cyclohexylphenol), 2,2'-methylene-bis-(6-nonyl-4-methylphenol), 2,2'-methylene-bis-(4,6-di-tert.-butylphenol), 2,2'-ethylidene-bis-(4,6-di-tert.-butylphenol), 2,2'-ethylidene-bis-(6-tert.-butyl-4-isobutylphenol), 4,4'-methylene-bis-(2,6-di-tert.-butyl-phenol), 4,4'-methylene-bis-(6-tert.-butyl-2-methylphenol), 1,1-bis-(5-tert.-butyl-4-hydroxy-2-methylphenyl)-butane, 2,6-di-(3-tert.-butyl-5-methyl-2-hydroxybenzyl)-4-methylphenol, 1,1,3-tris-(5-tert.-butyl-4-hydroxy-2-methylphenol)-butane, 1,1-bis-(5-tert.-butyl-4-hydroxy-2-methylphenyl)-3-n-dodecylmercaptobutane, ethylene glycol bis-[3,3-bis-(3'-tert.-butyl-4'-hydroxyphenyl)-butyrate], di-(3-tert.-butyl-4-hydroxy-5-methylphenyl)-dicyclopentadiene and di-[2-(3'-tert.-butyl-2'-hydroxy-5'-methyl-benzyl)-6-tert.-butyl-4-methyl-phenyl] terephthalate.

1.5. Benzyl compounds 1,3,5-Tri-(3,5-di-tert.-butyl-4-hydroxybenzyl)-2,4,6-trimethylbenzene, di-(3,5-di-tert.-butyl-4-hydroxybenzyl) sulfide, isooctyl 3,5-di-tert.-butyl-4-hydroxybenzylmercaptoacetate, bis-(4-tert.-butyl-3-hydroxy-2,6-dimethylbenzyl)-dithiol terephthalate, 1,3,5-tris-(3,5-di-tert.-butyl-4-hydroxybenzyl) isocyanurate, 1,3,5-tris-(4-tert.-butyl-3-hydroxy-2,6-dimethylbenzyl) isocyanurate, di-octadecyl 3,5-di-tert.-butyl-4-hydroxybenzyl-phosphonate and the calcium salt of monoethyl 3,5-di-tert.-butyl-4-hydroxybenzyl-phosphonate.

1.6. Acylaminophenols

4-Hydroxy-lauric acid anilide, 4-hydroxy-stearic acid anilide and 2,4-bis-octylmercapto-6-(3,5-di-tert.-butyl-4-hydroxyanilino)-S-triazine.

1.7. Esters of β-(3,5-di-tert.-butyl-4-hydroxyphenyl)-propionic acid

With monohydric or polyhydric alcohols, for example with methanol, octadecanol, hexane-1,6-diol, neopentylglycol, thiodiethylene glycol, diethylene glycol, triethylene glycol, pentaerythritol, tris-hydroxyethyl isocyanurate an dihydroxyethyl-oxalic acid diamide.

1.8. Esters of β-(5-tert.-butyl-4-hydroxy-3-methylphenyl)-propionic acid

With monohydric or polyhydric alcohols, for example with methanol, octadecanol, hexane-1,6-diol, neopentylglycol, thiodiethylene glycol, diethylene glycol, triethylene glycol, pentaerythritol, tris-hydroxyethyl isocyanurate and dihydroxyethyl-oxalic acid diamide.

1.9. β-(3,5-Di-tert.-butyl-4-hydroxyphenyl)-propionic acid amides,

For example N,N'-di-(3,5-di-tert.-butyl-4-hydroxyphenylpropionyl)-hexamethylenediamine, N,N'-di-(3,5-di-tert.-butyl-4-hydroxyphenylpropionyl)-trimethylenediamine and N,N'-di-(3,5-di-tert.-butyl-4-hydroxyphenylpropionyl)-hydrazine.

2. UV ABSORBERS AND LIGHT STABILISERS 2.1. 2-(2'-Hydroxyphenyl)-benztriazoles, for example the 5'-methyl, 3,5'-di-tert.-butyl, 5'-tert.-butyl, 5'-(1,1,3,3-tetramethylbutyl), 5-chloro-3',5'-di-tert.-butyl, 5-chloro-3'-tert.-butyl-5'-methyl, 3'-sec.-butyl-5'-tert.-butyl, 4'-octoxy and 3',5'-di-tert.-amyl derivatives.

2.2. 2-Hydroxybenzophenones, for example 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of substituted or unsubstituted benzoic acids, for example 4-tert.-butyl-phenyl salicylate, phenyl salicylate, octylphenyl salicylate, dibenzoyl-resorcinol, bis-(4-tert.-butylbenzoyl)-resorcinol, benzoylresorcinol and 2,4-di-tert.-butylphenyl 3,5-di-tert.-butyl-4-hydroxybenzoate.

2.4. Acrylates, for example ethyl or isooctyl α-cyano-β,β-diphenylacrylate, methyl α-carbomethoxy-cinnamate, methyl or butyl α-cyano-β-methyl-p-methoxycinnamate, methyl α-carbomethoxy-p-methoxy-cinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenol], such as the 1:1 or 1:2 complex, if appropriate with additional ligands such as n-butylamine, triethanolamine or N-cyclohexyldiethanolamine, nickel dibutyldithiocarbamate, the nickel salts of 4-hydroxy-3,5-di-tert.-butylbenzyl-phosphonic acid monoalkyl esters, such as of the methyl or ethyl ester, nickel complexes of ketoximes, such as of 2-hydroxy-4-methyl-phenyl undecyl ketoxime, and nickel complexes of 1-phenyl-4-lauroyl-5-hydroxy-pyrazole, if appropriate with additional ligands.

2.6. Oxalic acid diamides, for example 4,4'-di-octyloxyoxalic acid anilide, 2,2'-di-octyloxy-5,5'-di-tert.-butyloxalic acid anilide, 2,2'-di-dodecyloxy-5,5'-di-tert.-butyl-oxalic acid anilide, 2-ethoxy-2'-ethyl-oxalic acid anilide, N,N'-bis-(3-dimethylaminopropyl)-oxalic acid amide, 2-ethoxy-5-tert.-butyl-2'-ethyl-oxaic acid anilide and its mixture with 2-ethoxy-2'-ethyl-5,4'-di-tert.-butyl-oxalic acid anilide, and mixtures of ortho- and para-methoxy-disubstituted and also of o- and p-ethoxy-disubstituted oxalic acid anilides.

3. Metal deactivators, for example N,N'-diphenyloxalic acid diamide, N-salicylal-N'-salicyloylhydrazine, N,N'-bis-salicyloylhydrazine, N,N'-bis-(3,5-di-tert.-butyl-4-hydroxyphenylpropionyl)-hydrazine, 3-salicyloylamino-1,2,4-triazole and bis-benzylideneoxalic acid dihydrazide.

4. Phosphites and phosphonites, for example triphenyl phosphite, diphenylalkyl phosphites, phenyldialkyl phosphites, tri-(nonylphenyl) phosphite, trilauryl phosphite, trioctadecyl phosphite, distearyl-pentaerythritol diphosphite, tris-(2,4-di-tert.-butylphenyl) phosphite, diisodecyl-pentaerythritol diphosphite, di-(2,4-di-tert.-butylphenyl)-pentaerythritol diphosphite, tristearyl-sorbitol triphosphite and tetrakis-(2,4-di-tert.-butylphenyl) 4,4'-biphenylenediphosphonite.

5. Peroxide-destroying compounds, for example esters of β-thio-dipropionic acid, such as the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis-(4-dodecylmercapto)-propionate.

6. Polyamide stabilisers, for example copper salts in combination with iodides and/or phosphorus compounds, and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example Ca stearate, Zn stearate, Mg stearate, Na ricinoleate and K palmitate, and antimony pyrocatecholate or tin pyrocatecholate.

8. Nucleating agents, for example 4-tert.-butylbenzoic acid, adipic acid and diphenylacetic acid.

9. Fillers and reinforcing agents, for example calcium carbonates, silicates, glass fibres, asbestos, talc, kaolin, mica, barium sulfate, metal oxides and hydroxides, carbon black and graphite.

10. Other additives, for example plasticisers, lubricants, emulsifiers, pigments, fluorescent brighteners, flameproofing agents, antistatic agents and propellants.

The surprising synergistic effect which is achieved by using the stabiliser mixtures according to the invention is illustrated by the following example:

EXAMPLE 1

Light-stabilising action in polypropylene films 100 parts of polypropylene powder (melt flow index 230° C./2.16 kg ~ 12) are homogenised for 10 minutes, in a Brabender plastograph, at 200° C., with 0.05 part of pentaerythrityl tetrakis-3-(3,5-di-tert.-butyl-4-hydroxyphenyl)-propionate, 0.05 part of tris-(2,4-di-tert.-butylphenyl) phosphite and 0.075 part of each two stabilisers, from the following table. The composition thus obtained is removed from the kneader as rapidly as possible and compression-moulded in a toggle press to give a 2–3 mm thick plate. Part of the crude moulding obtained is cut out and compressed between two high-gloss hard aluminium foils by means for a laboratory press for 6 minutes, at 260° and a pressure of 12 tonnes, to give a 0.1 mm thick film, which is immediately quenched in cold water. Portions each of 45×45 mm are now punched from this film and irradiated in a Xenotest 1200. At regular intervals of time, these test samples are removed from the irradiation apparatus and tested for their carbonyl content in an IR spectrophotometer. The increase in the carbonyl extinction on exposure is a measure of the photooxidative degradation of the polymer (cf. L. Blaban et al., J. Polymer Sci. Part C, 22, 1059–1071 (1969); J. F. Heacock, J. Polymer Sci. Part A-1, 22, 2921–34 (1969); D. J. Carlsson and D. M. Wiles, Macromolecules 2, 587–606 (1969)) and, according to experience, is associated with a deterioration in the mechanical properties of the polymer.

The time taken to reach a carbonyl extinction of 0.100 is considered to be a measure of the stabilising action.

The results are summarised in the Table.

TABLE 1

Light-stabilising action in 0.1 mm polypropylene films

| Stabiliser | Hours in the Xenotest 1200 to a carbonyl extinction of 0.1 ($T_{0.1}$) |
|---|---|
| Control | 280 |
| 0,075% B-5 + 0,075% A-1 | 3750 |
| 0,075% B-5 + 0,075% A-11 | 2650 |
| 0,075% B-5 + 0,075% A-12 | 3100 |
| 0,075% B-5 + 0,075% A-13 | 2850 |
| 0,075% B-5 + 0,075% A-5 | 3300 |
| 0,075% B-5 + 0,075% A-7 | 2800 |
| 0,075% B-5 + 0,075% A-3 | 2900 |
| 0,075% B-6 + 0,075% A-1 | 3200 |
| 0,075% B-6 + 0,075% A-12 | 2600 |
| 0,075% B-6 + 0,075% A-13 | 2500 |
| 0,075% B-6 + 0,075% A-7 | 2600 |
| 0,075% B-3 + 0,075% A-1 | 2900 |
| 0,075% B-3 + 0,075% A-12 | 2600 |
| 0,075% B-4 + 0,075% A-1 | 3200 |
| 0,075% B-3 + 0,075% A-13 | 2400 |
| 0,075% B-3 + 0,075% A-7 | 2600 |
| 0,075% B-3 + 0,075% A-3 | 2650 |
| 0,075% B-7 + 0,075% A-1 | 4100 |
| 0,075% B-7 + 0,075% A-13 | 2650 |
| 0,075% B-7 + 0,075% A-7 | 2750 |
| 0,075% B-7 + 0,075% A-3 | 2600 |
| 0,075% B-8 + 0,075% A-1 | 3800 |
| 0,075% B-8 + 0,075% A-7 | 2900 |
| 0,075% B-8 + 0,075% A-3 | 2800 |
| 0,075% B-4 + 0,075% A-3 | 2800 |
| 0,075% B-4 + 0,075% A-4 | 2950 |
| 0,075% B-4 + 0,075% A-9 | 2700 |
| 0,075% B-4 + 0,075% A-8 | 3400 |
| 0,075% B-10 + 0,075% A-1 | 4200 |
| 0,075% B-10 + 0,075% A-7 | 3250 |
| 0,075% B-10 + 0,075% A-9 | 3100 |
| 0,075% B-1 + 0,075% A-3 | 2200 |
| 0,075% B-2 + 0,075% A-12 | 3300 |

EXAMPLE 2

Light-stabilising action in polyurethane cast films 100 parts of a commercial, non-stabilised polyurethane resin (®Estane 5707 Fl) and 0.25 part each of a component A and a component B, as shown in the following Table 2, are dissolved in 300 parts of a 1:1 mixture of dimethylformamide and acetone. Shaking is maintained overnight in order to ensure a complete solution. The polymeric solution is then poured onto glass plates to obtain films having a thickness of 430 μ. The films are dried on the glass plates for 4 minutes at 60° C. and subsequently for 6 minutes at 140° C. in an air-circulation oven. The product obtained is a dry cast film of 65 μ. This is removed from the glass plates and is cut into test specimens 5×10 cm in size.

The test specimens are irradiated in a Xenotest 450 until a transmission lost of 15% at 420 nm has occurred.

The results are summarised in the following Table 2.

TABLE 2

Light-stabilising action in 65 μm thick polyurethane cast films

| Stabilisers | Hours in the Xenotest 450 until 15% transmission loss at 420 nm has occurred |
|---|---|
| control | 100 |
| 0,25% A-1 + 0,25% B-4 | 1050 |
| 0,25% A-1 + 0,25% B-5 | 1000 |
| 0,25% A-7 + 0,25% B-5 | 1000 |
| 0,25% A-7 + 0,25% B-1 | 800 |
| 0,25% A-11 + 0,25% B-5 | 950 |

EXAMPLE 3

Light-stabilising action in crystal polystyrene 100 parts of crystal polystyrene pellets are mixed dry with 0.1 part of component A and 0.1 part of component B, as shown in the following Table 3, and the dry mixture is then homogenised by extrusion. The stabilised pellets thus obtained are injection moulded to obtain plates 2 mm in thickness. These plates are irradiated for 2000 hours in a Weather-O-Meter WRC 600, and the Yellowness Index (YI) is measured according to ASTM D 1925/70.

The results are given in the following Table 3.

TABLE 3

Light-stabilising action in 2 mm crystal polystyrene, injection-moulded plates

| Stabilisers | YI after 2000 hours in the Weather-O-Meter WRC 600 |
|---|---|
| control | 49,8 |
| 0,1% A-1 + 0,1% B-4 | 15,7 |
| 0,1% A-7 + 0,1% B-1 | 22,1 |
| 0,1% A-11 + 0,1% B-5 | 25,5 |

What is claimed is:

1. A stabiliser system consisting essentially of (A) a low-molecular, sterically hindered polyalkylpiperidine selected from the compounds of the formulae

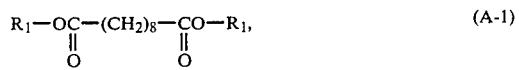

(A-1)

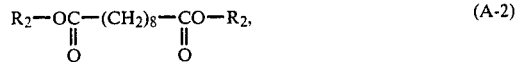

(A-2)

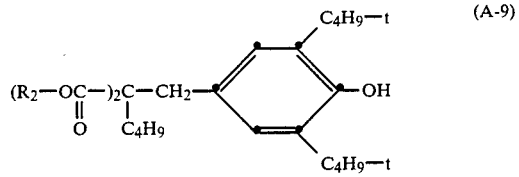

(A-9)

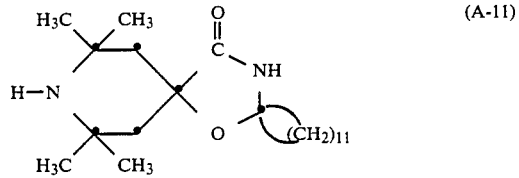

(A-11)

and in which $R_1$ is a group of the formula

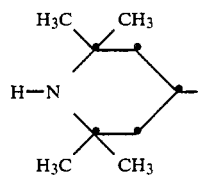

and $R_2$ is a group of the formula

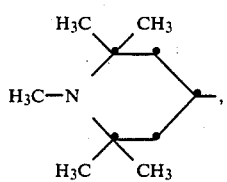

and (B) a high-molecular, sterically hindered polyalkyl-piperidine selected from the compounds of formulae

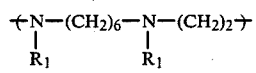 (B-2)

with degree of polymerization of 5-50,

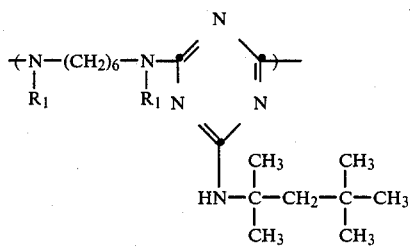 (B-4)

with degree of polymerization of 3-50, and

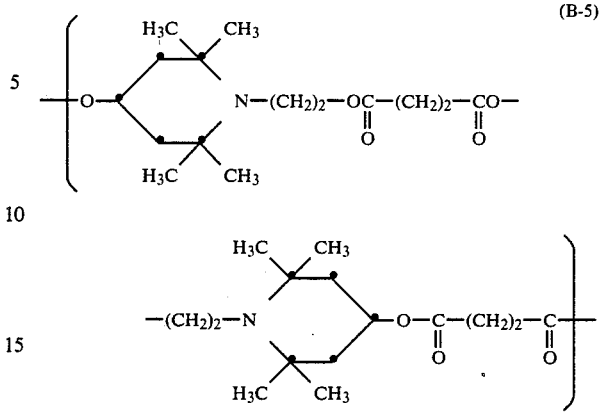

with degree of polymerization of 2-25 wherein $R_1$ is as defined above, said components being present in a weight ratio of 5:1 to 1:5.

2. A stabiliser system according to claim 1, containing the compound (A-1) as component (A) and the compound (B-5) as component (B).

3. A stabiliser system according to claim 1, containing the compound (A-11) as component (A) and the compound (B-5) as component (B).

4. A stabiliser system according to claim 1, containing the compound (A-1) as component (A) and the compound (B-4) as component (B).

5. A stabiliser system according to claim 1, containing the compound (A-9) as component (A) and the compound (B-4) as component (B).

6. Organic polymeric material containing 0.01 to 5% by weight, based on the organic material, of the stabiliser system according to claim 1.

* * * * *